1,684,015

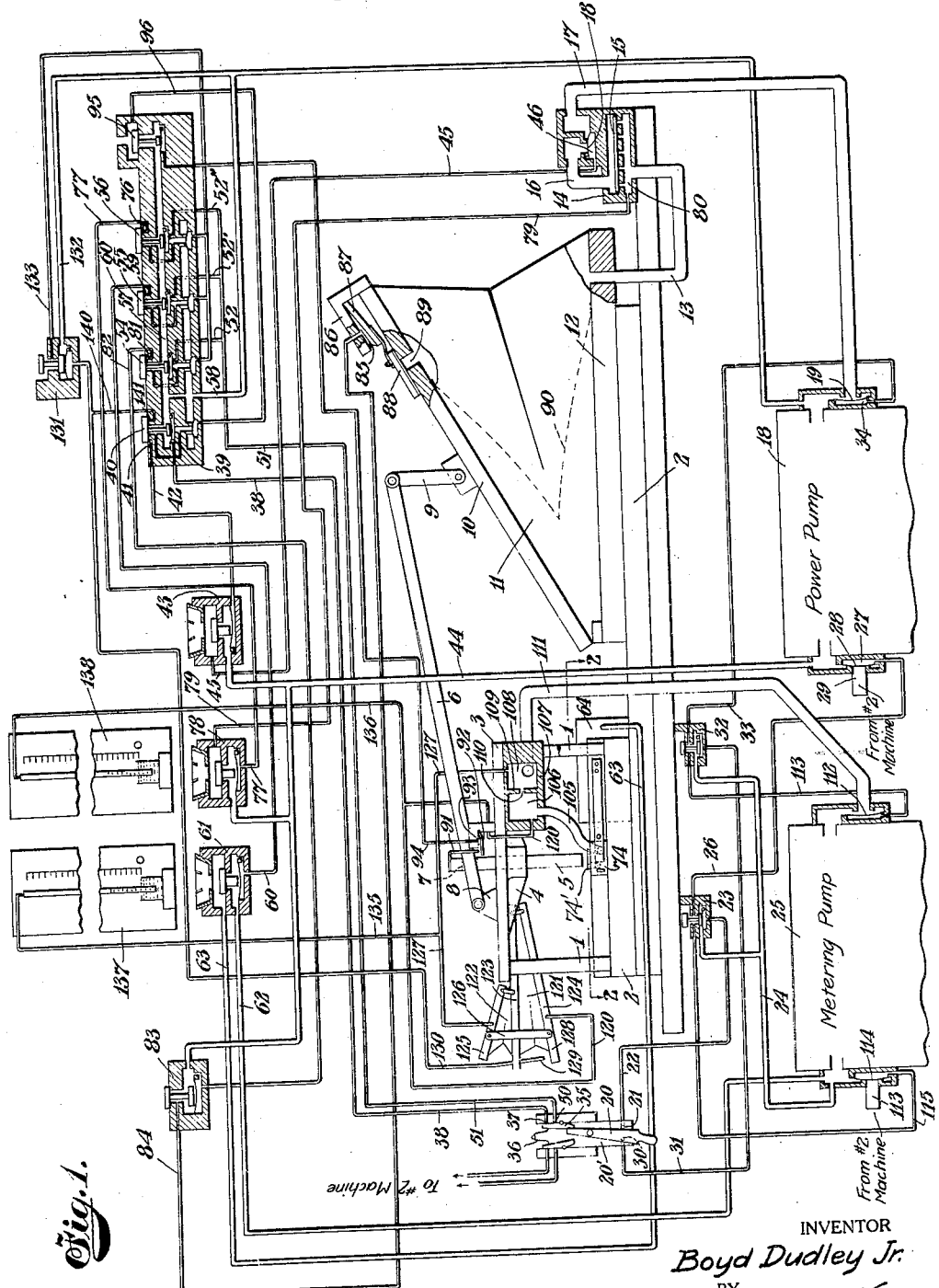
Sept. 11, 1928.
B. DUDLEY, JR
1,684,015
APPARATUS FOR ADJUSTING VALVE THROW
Original Filed July 10, 1924    2 Sheets-Sheet 1
INVENTOR
Boyd Dudley Jr.
BY
ATTORNEYS Sept. 11, 1928.
B. DUDLEY, JR
1,684,015
APPARATUS FOR ADJUSTING VALVE THROW
Original Filed July 10, 1924    2 Sheets-Sheet 2
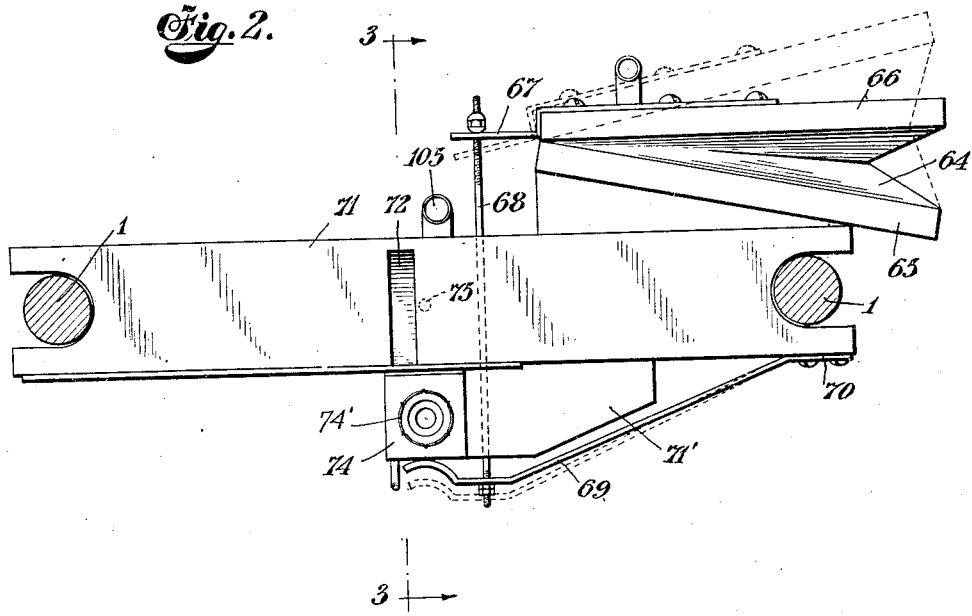
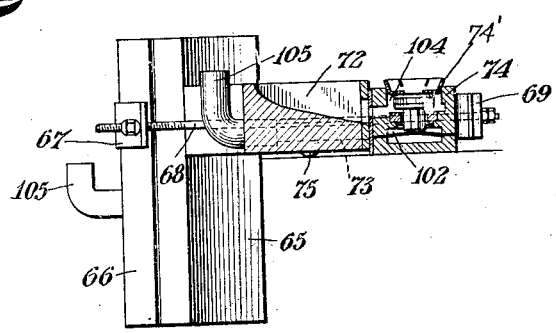
INVENTOR
Boyd Dudley Jr.
BY
ATTORNEYS Patented Sept. 11, 1928.

UNITED STATES PATENT OFFICE.

BOYD DUDLEY, JR., OF SYRACUSE, NEW YORK, ASSIGNOR TO AMERICAN PIANO COMPANY, OF NEW YORK, N. Y., A CORPORATION OF NEW JERSEY.

APPARATUS FOR ADJUSTING VALVE THROW.

Application filed July 10, 1924, Serial No 725,313. Renewed March 20, 1928.

This invention relates to apparatus for adjusting valve throw, and has as one of its objects the provision of a machine by which the throw of a valve may be quickly and accurately adjusted.

It is a further object of this invention to provide an automatic control for said machine.

Other objects and advantages of the invention will appear hereinafter.

A preferred embodiment of the invention selected for purposes of illustration is shown in the accompanying drawing, in which, Figure 1 is a semi-diagrammatic view of the device, certain parts being broken away and others being shown in section to more clearly illustrate the construction and operation thereof.

Figure 2 is a section on the line 2—2 of Figure 1,

Figure 3 is a section on the line 3—3 of Figure 2.

In the manufacture of valve actions and particularly in the manufacture of those of the type used in automatic pneumatic musical instruments and other pneumatic structures, it is desirable to produce similar valves having substantially the same capacity to pass air. In many cases this desideratum is sufficiently attained simply by attention to accuracy in lineal measurement as the parts are made. In other cases where greater accuracy is desired, provision is made whereby the valve or valve seats are made adjustable with respect to each other, in order that proper adjustment may be made after the valve action is assembled.

Usually, however, such adjustment has been effected with reference simply to the lineal throw of the valve, it being assumed that similar valves having the same throw would have substantially the same capacity to pass air. It has been found, however, that due to surface conditions inside of the valve action, this assumption is often untrue. For instance, valves are often provided with leather faces designed to insure air tight contact with the valve seat. Some of these faces offer greater resistance to the passage of air than others with the result that while the lineal travel of similar valves may be exactly the same, their capacity to pass air will be different. Frequently too, the free passage of air through the passages of the action is impeded by bits of glue used in securing the parts of the action together.

The present invention accordingly has as an object to provide an apparatus by which the throw of a valve may be adjusted with reference to the capacity of the valve action to pass air and irrespective of its lineal throw.

In the embodiment of the invention illustrated in the accompanying drawings and described herein, means have been provided for adjusting the valve seat with respect to the valve, although, as will be apparent, the invention could be applied with equal facility to devices for effecting adjustment by other methods. Accordingly, as a convenient means of effecting such adjustment there has been provided a press by which the valve seat may be forced into place until its desired position of adjustment has been reached.

Referring to the drawings, standards 1 have been provided fixed to the base 2 and supporting the upper board 3 of the press. On the under side of the upper board 3 is secured a guide block 4 in which is slidably mounted the plunger 5 which serves to press the valve seat 74' to adjusted position. The plunger is operated by a lever 6 which engages the rounded shoulders 7 of the plunger, and which is fulcrumed on the boss 8 mounted on the upper board 3. At its other end the lever 6 is connected by a link 9 to the movable board 10 of the power pneumatic 11, the board 12 of said pneumatic being fixed to the base 2.

As will be apparent, collapsing movement of the pneumatic 11 will serve to depress the plunger 5 and expanding movement of the same will cause the plunger to be raised from its depressed position. Entering the pneumatic 11, through the fixed board 12, is a passage 13 through which air may be withdrawn from the pneumatic to collapse the same to thereby actuate the plunger 5. The passage 13 leads to a valve box 14 in which is placed the check valve 15, and leading therefrom on the other side of the check valve is a passage 16 communicating with the passage 17, said communication being controlled by the diaphragm 18 mounted in the upper part of the valve box 14. The passage 17 leads to the power pump 18 and communication therebetween is controlled by the diaphragm 19 mounted at the entrance of the passage 17 to the pump. As will be apparent, if the diaphragms 19 and 18 are both open to permit passage of air therethrough, the pneumatic 11 will be rapidly collapsed as the check valve 15 would be lifted by the rush of air therethrough. On the other hand, if either of the diaphragms 19 or 18 are raised to close the passage, collapse of the pneumatic 11 will be stopped.

It has been found convenient to operate two of the machines herein described under control of a single operative and the control lever 20 is provided, therefore, pivotally mounted on the block 20' through which the operator may cause the operation of the two machines alternately. Inasmuch as the two machines are duplicates, only one will be described herein, although the operative connections with the second machine will be illustrated.

When the control lever 20 is moved to the left, a port 21 is uncovered, thus permitting an inrush of atmospheric air through the duct 22 to the primary valve 23 which is maintained under exhaust through the duct 24 leading to a pump 25 to be hereafter described. The inrush of air to the valve 23 raises the valve and allows the passage of atmospheric air through the duct 26 to the diaphragm chamber 27, thereby pressing outwardly the diaphragm 28 and cutting off communication between the power pump 18 and the passage 29 corresponding to the passage 17 but leading to the other machine.

At the same time that the control lever 20 uncovers the port 21, it covers the port 30 connecting with a duct 31 leading to the primary valve 32 also maintained under exhaust through the duct 24 by the pump 25. Since the passage of atmospheric air to the port 30 and duct 31 is prevented by the control lever 20, valve 32 will remain seated and exhaust therefrom will be communicated through the duct 33 to the diaphragm chamber 34 to draw the valve 19 away from the end of passage 17 to thereby permit the passage of air therethrough.

At the same time that the control lever is moved to the left to uncover the port 21, and to cover the port 30, the opposite end of the control lever 20 will depress the pallet valve 35 momentarily against the tension of the spring 36 to admit a puff of atmospheric air through the port 37 to the duct 38 leading to the diaphragm chamber 39 of the primary valve 40. This valve may conveniently be of any well-known lock valve construction in order that when it has been once raised by the momentary inrush of air through the port 37, it will remain in that condition until purposely lowered although the port 37 is closed by valve 35. The lock valve illustrated herein is an old and common construction and will not be described in detail. When the valve 40 is raised the port 41 is exposed and an inrush of atmospheric air to the duct 42 leading to the secondary valve 43 results. This valve is maintained under exhaust through the duct 44 leading to the power pump 18. When atmospheric air is admitted to the duct 42 the valve is raised and exhaust is communicated through the passage 45 controlled by the valve to the diaphragm chamber 46 controlling the diaphragm 18 before described, thus drawing the diaphragm downward and permitting the free passage of air through passages 16 and 17.

The movement of the control lever 20 to the left also permits a momentary puff of atmospheric air through the port 50 to the duct 51 connected by the connecting ducts 52, 52' and 52'' to the diaphragm chambers controlling lock valves 54, 55 and 56 respectively, which are similar in construction and operation to the lock valve 40. The exhaust chamber 57, common to all the valves, is maintained under exhaust through the duct 58 leading to the power pump 18.

When atmospheric air is admitted to the duct 52' to raise the valve 55, as before described, the port 59 is opened to atmospheric air, thus permitting an inrush of air through the duct 60 to the secondary valve 61, which valve is maintained under exhaust through the passage 62 leading to the pump 25. Valve 61 controls a duct 63 leading to a power pneumatic 64 adapted to clamp the valve unit in place under the plunger 5. The pneumatic 64 has a leaf 65 fixed to the base of the press and a movable leaf 66 to which is attached a spur 67 connected by the rod 68 to a clamp member 69 fixed at 70 to the base. A block 71, having passages 72 and 73 registering with the passages of the valve unit 74 being adjusted, is also mounted on the base 2 and has a round headed screw 75 in the bottom thereof in order that the block 71 may pivot thereon to form an air tight contact with the valve unit. Collapse of the pneumatic 64, due to operation of the secondary valve 61 before described, therefore, causes the valve unit to be clamped tightly to the block 71 and to be held thereto so long as the valve 61 remains in raised position. If desired, a guide block 71' may be fixed to the block 71 to assist the operator in locating the valve action correctly with respect to the passages 72 and 73.

When the control lever 20 is moved to the left, and the valve 56 is raised thereby, port 76 is uncovered and an inrush of atmospheric air to the duct 77 results. This duct leads to the secondary valve 78 also maintained under exhaust through the duct 44 by the power pump 18. Secondary valve 78 controls the duct 79 leading to chamber 80 in the valve box 14 immediately below the check valve 15. Operation of the secondary valve 78, therefore, will cause a slow exhaust through the duct 79 from the chamber 80, and, therefore, from the pneumatic 11 through the passage 13. When the passages 16 and 17 are open and air is being withdrawn by the power pump through these passages, the effect of this slow exhaust will be negligible. When, however, the passage of air through these passages is prevented by operation of the diaphragm 18, the check valve 15 will close and a slow collapse of the pneumatic 11 will result.

The raising of the valve 54 by movement of the control valve 20 will cause the uncovering of port 81 thereby permitting the inrush of atmospheric air to the duct 82 leading to the secondary valve 83. This valve, which is of the outside valve type, controls a duct 84 leading to the pneumatic 85 mounted on the movable leaf 10 of the pneumatic 11. Pneumatic 85 consists of a leaf 86 fixed with respect to the leaf 10 and a movable leaf 87 connected to the flap valve 88, controlling a port 89 opening into the power pneumatic 11, and forms a spill valve by which atmospheric air may be admitted to the pneumatic to permit rapid expansion thereof under the influence of spring 90. When the valve 83 is operated, atmosphere air is permitted to enter the duct 84 leading to the pneumatic 85 and the pneumatic expands, permitting the spill valve to close in order that the pneumatic 11 may be collapsed.

To sum up, movement of the control lever 20 first opens communication between the power pump and the passage 17, and closes communication between the power pump and the passage 29 leading to the second machine. At the same time, through operation of the pallet valve 35, a fast collapse of the pneumatic 11 is initiated through the opening of communication between passages 16 and 17. A slow collapse of the pneumatic 11 is also initiated through the duct 79 and the spill valve 88 is permitted to close so that the pneumatic 11 may be collapsed.

The manner in which these various operations after being initiated may be automatically controlled and stopped at the proper time may now be considered.

As has been described before, two separate means are provided for exhausting the power pneumatic 11, one of which may be described as the fast or high speed exhaust, and the other of which may be described as the slow or low speed exhaust. The high speed exhaust is provided to exhaust the pneumatic 11 rapidly to bring the plunger and the valve seat pressed thereby to a rough position of adjustment from which the slow speed exhaust may operate to bring the valve seat into a more perfect and more accurate adjustment. Means are provided, therefore, to stop the operation of the high speed exhaust when a comparatively rough adjustment has been effected, and, as illustrated, such means may be controlled by the position of the plunger itself.

The plunger is provided with a lug 91 extending outwardly therefrom in position for engagement with a spring pressed valve 92 controlling the port 93. As the plunger is lowered by the collapse of the pneumatic 11, the lug 91 engages the valve 92 and opens the port 93 and the duct 94 to atmospheric air. Duct 94 leads to valve 95, and operation of this valve causes the duct 96 to be exhausted, to release the lock valve 40 previously described, to permit the same to drop back to normal position. Duct 42 is closed thereby, valve 43 returns to normal position allowing atmospheric air to enter the duct 45 and diaphragm chamber 46, thus raising the diaphragm 18 to close the connection between passages 16 and 17. The high speed collapse of pneumatic 11 is stopped thereby, but the pneumatic continues to be collapsed slowly by means of the low speed exhaust.

Means are also provided for stopping the operation of the low speed exhaust, for opening the spill valve 88 to permit the expansion of the pneumatic 11 to raise the plunger, and for permitting the release of the clamp 69 to release the valve action, and such means are preferably operated simultaneously from a single control. Such means are also preferably controlled, not by the position of the plunger as in the case of the high speed exhaust, but by the rate of flow of air through the port controlled by the valve which rate is dependent upon the position of the valve seat being adjusted.

As before described, a passage 73 is provided in the block 71 which communicates with the exhaust chest 102 of the valve action being adjusted and a passage 72 is also provided therein communicating with the valve chamber 104 of the valve action. Passage 73 communicates with a conduit 105 leading to the chamber 106 of the meter box 107. The meter box also comprises an additional chamber 108 separated from the chamber 106 by a plate 109 having an orifice 110 of fixed area therein. A conduit 111 leads from the chamber 108 to the pump 25 before referred to. This pump may be described as a meter pump as it serves to withdraw air through the meter box 107 and the valve action for a purpose hereafter described. The connection between the passage 111 and the pump 25 is controlled by a diaphragm 112 having a diaphragm chamber connected by the duct 113 to the valve 32. When the control lever 20 is moved to the left, as before described, in controlling the power pump, the diaphragm 112 is drawn away from the end of conduit 111 to permit communication between the pump and the meter box 107. On the other hand, a similar passage 113 leading to a meter box on the second machine is closed by the diaphragm 114 connected by the duct 115 to the valve 23 previously described.

Separate pumps 25 and 18 are provided for metering and power respectively, simply for convenience, as it is found that it is desirable to maintain a reasonably high degree of exhaust for metering while a much lower degree of exhaust can be used successfully for power purposes. It has also been found that the high speed exhaust before described makes large drafts on the capacity of a pump which would cause wide variations in the degree of exhaust maintained by the pump. While this is not fatal to success in operation, it has been found desirable to provide a separate metering pump which may maintain a substantially constant degree of exhaust.

Leading from the chamber 106 is a duct 120 which is connected to the interior of the pneumatic 121 forming the larger of a pair of connected pneumatics, the other of which is designated by 122. These pneumatics are provided with a common fixed leaf 123 and the movable leaves 124 and 125 are connected by a bar 126 pivotally connected thereto. A duct 127 leading from the chamber 108 is connected to the interior of the smaller pneumatic 122.

The degree of exhaust maintained in the chamber 106 and communicated to the larger pneumatic 121 through the duct 120 will be determined by the amount of constriction imposed by the passage of air through the port in the valve action controlled by the valve. And the degree of constriction imposed will in turn be determined by the position of the valve seat being adjusted. The degree of exhaust in the chamber 108 and communicated to the smaller pneumatic 122 through the duct 127 will be dependent not only upon the constriction imposed by the passage of air through the valve action but also upon the constriction imposed by passage of the air through the orifice 110. A higher degree of exhaust will, therefore, be maintained in the chamber 108 and the pneumatic 122 than in the chamber 106 and the pneumatic 121. As the constriction imposed by the passage of air through the valve action is increased by the pressing downward of the plunger and the valve seat, the degree of exhaust in the chamber 106 will be gradually increased, and will continue to increase until the exhaust in the chamber 106 and the pneumatic 121 acting on the larger area of this pneumatic is sufficient to overcome the opposed force of the exhaust maintained in the chamber 108 acting on the smaller area of the pneumatic 122.

When this condition occurs, the extension 128 of the movable leaf 124 will close the port 129 of the duct 130 leading to the valve 131. This valve is maintained under exhaust through the passage 132 leading to the power pump 18 and is of the outside valve type. When the port 129 is closed, the valve 131 is permitted to drop and exhaust therefrom is communicated through the duct 133 to the release devices of the lock valves 54, 55 and 56 to permit all of these valves to return simultaneously to normal position. Secondary valves 78, 61 and 83 will also return to normal position, thereby stopping the low speed exhaust, releasing the clamp and opening the spill valve 88 to permit the pneumatic 11 to expand. As will be apparent, the position of the port 129 may be adjusted with respect to the pneumatics 121 and 122 so that the port 129 may be closed in any desired relative position of the two pneumatics. The proper position of the port 129 may be conveniently determined by experiment, the particular position of adjustment desired being dependent upon the rate of flow desired through the valve actions being adjusted, the degree of exhaust maintained by the meter pump, and the size of the fixed orifice 110.

If desired, branch ducts 135 and 136 may be connected to the ducts 127 and 120 respectively to lead to pressure gauges 137 and 138 respectively which gauges may be used as a check on proper operation of the device. As will be apparent, the height of the water in the gauges is dependent on the degree of exhaust maintained in the chambers 106 and 108, and when the degrees of exhaust have reached the desired relationship at which the port 129 is closed, the exhaust indicated by the pressure gauges will also reach a predetermined relationship.

It may sometimes happen that the valve action being adjusted is provided with an unusually baggy diaphragm in which case the diaphragm might bulge upwardly to constrict the passage through the valve in such manner as to cause the port 129 to be closed prematurely before the high speed exhaust has completed its operation. In order to provide for such a contingency, and to insure that the operation of the device be not prematurely stopped, a duct 140 is provided leading to a port 141 controlled by the valve 40. This duct is also connected to the duct 130 leading to the valve 131. Thus when the valve 40 is raised to permit the high speed exhaust to be operated, the port 141 is also exposed to atmospheric air to raise the valve 131 regardless of the condition of the port 129. When the valve 40 is again seated, the port 129 may again control the position of the valve 131 to thereby control the operation of the machine.

As will be observed, stopping of the low speed exhaust and the releasing of the clamp and the opening of the spill valve 88 are dependent on the rate of flow of air through the valve action being adjusted and the machine automatically, therefore, ceases to operate when the valve has reached the desired position of adjustment.

It is to be understood that the invention may be variously modified and embodied within the scope of the subjoined claims.

I claim as my invention:

1. In a machine for adjusting valve throw in pneumatic valve actions, in combination, a press, means to actuate said press, and means controlled by the rate of flow of air through said valve action for controlling said actuating means.

2. In a machine for adjusting valve throw in pneumatic valve actions, in combination, a press, means to actuate said press, and means for stopping the action of said press actuating means when the rate of flow through said valve action reaches a predetermined point.

3. In a machine for adjusting valve throw in pneumatic valve actions, in combination, a press, means for actuating said press including high speed actuating means and low speed actuating means, means for causing both said actuating means to operate simultaneously, and means for causing said actuating means to cease operation successively.

4. In a machine for adjusting valve throw in pneumatic valve actions, in combination, a press, means for actuating said press including high speed actuating means and low speed actuating means, means for causing both said actuating means to operate simultaneously, means for causing said high speed actuating means to cease operation, and separate means for causing said low speed actuating means to cease operation.

5. In a machine for adjusting valve throw in pneumatic valve actions, in combination, a press, means for actuating said press including high speed actuating means and low speed actuating means, means for causing both said actuating means to operate simultaneously, means controlled by the position of the press for causing said high speed actuating means to cease operation, and means controlled by the rate of flow of air through said valve action for causing said low speed actuating means to cease operation.

6. In a machine for adjusting valve throw in pneumatic valve actions, in combination, a press, means to clamp a valve action to said press, means to operate said press to adjust the valve throw, and means to actuate said clamp means and said press operating means simultaneously.

7. In a machine for adjusting valve throw in pneumatic valve actions, in combination, a press, means to clamp a valve action to said press, means to operate said press to adjust the valve throw, means to actuate said clamp means and said press operating means simultaneously, and means to cause said means to be released simultaneously.

8. In a machine for adjusting valve throw in pneumatic valve actions, in combination, a press, pneumatic means to operate said press, means to stop the operation of said press operating means, and simultaneously operable means to spill atmospheric air to said press operating means to permit said means to return to inoperative position.

9. In a machine for adjusting valve throw in pneumatic valve actions, in combination, a press, pneumatic means to operate said press, pneumatic means to clamp a valve action to said press, and separate means to simultaneously stop the operation of said press operating means, release said clamping means and spill atmospheric air to said press operating means to permit said means to return to inoperative position.

10. Control mechanism for valve throw adjusting machines, comprising, in combination, a pair of opposed connected pneumatics of different area, a pair of ducts connecting said pneumatics with chambers in which are maintained different degrees of exhaust, and means operated by said pneumatics for stopping the operation of the machine when said degrees of exhaust assume a predetermined relation.

11. Control mechanism for valve throw adjusting machines, comprising, in combination, means providing a pair of chambers having an orifice of fixed area therebetween, a pair of opposed connected pneumatics of different area each having communication with one of said chambers, means to withdraw air through a valve action and through said chambers and orifice whereby different degrees of exhaust are established in said chambers, and a valve controlled by said pneumatics and adapted to be closed by the collapse of one of said pneumatics.

12. In a machine for adjusting valve throw in pneumatic valve actions, a press, means to operate said press, and means to control said press operating means, including a pair of opposed connected pneumatics of different area in which are maintained different degrees of exhaust.

13. In a machine for adjusting valve throw in pneumatic valve actions, in combination, means for effecting relative longitudinal movement between a valve and valve seat, whereby the capacity of the valve action to pass air is varied, and means controlled by the rate of flow of air through said valve action for controlling said first named means.

14. In a machine for adjusting valve throw in pneumatic valve actions, in combination, means for effecting relative longitudinal movement between a valve and valve seat, whereby the capacity of the valve action to pass air is varied, means for actuating said means including high speed actuating means and low speed actuating means, means operated by said first named means for causing said high speed actuating means to cease operation, and means controlled by the rate of flow of air through said valve action for causing said low speed actuating means to cease operation.

15. In a machine for adjusting valve throw in pneumatic valve actions, in combination, means for effecting relative longitudinal movement between a valve and valve seat; means for controlling said first named means including means to initiate said adjusting movement; and means controlled by the capacity of the valve action to pass air to terminate said adjusting movement.

16. In a machine for adjusting valve throw in pneumatic valve actions, in combination, means for effecting relative longitudinal movement between a valve and valve seat, including high speed operating means and low speed operating means; means to initiate said adjusting movement by causing operation of said high and low speed operating means simultaneously; means controlled by said adjusting means in its adjusting movement to stop said high speed operating means, and means controlled by the capacity of the valve action to pass air to stop said low speed adjusting means.

In testimony whereof, I have signed my name to this specification this eighth day of July, 1924.

BOYD DUDLEY, Jr.